United States Patent [19]
Goldberg et al.

[11] Patent Number: 6,049,768
[45] Date of Patent: Apr. 11, 2000

[54] SPEECH RECOGNITION SYSTEM WITH IMPLICIT CHECKSUM

[75] Inventors: Randy G. Goldberg, Princeton; John Bruce Harlow, Middletown, both of N.J.

[73] Assignee: A T & T Corp, New York, N.Y.

[21] Appl. No.: 08/963,381

[22] Filed: Nov. 3, 1997

[51] Int. Cl.[7] .................................................. G10L 15/22
[52] U.S. Cl. ........................... 704/273; 704/231; 714/807
[58] Field of Search .................................... 704/246, 250, 704/231, 273; 714/49, 52, 807, 808; 395/185.01, 185.02, 185.04, 185.05

[56] References Cited

U.S. PATENT DOCUMENTS

| | | | |
|---|---|---|---|
| 3,571,581 | 3/1971 | Kaus et al. ................................ | 714/807 |
| 5,222,187 | 6/1993 | Doddington et al. ...................... | 395/2 |
| 5,283,829 | 2/1994 | Anderson .................................. | 380/24 |
| 5,652,786 | 7/1997 | Rogers .................................. | 379/91.01 |
| 5,737,489 | 4/1998 | Chou et al. .............................. | 704/256 |
| 5,832,235 | 11/1998 | Wilkes ................................. | 395/200.77 |
| 5,875,248 | 2/1999 | Lewis ........................................... | 380/4 |

*Primary Examiner*—David R. Hudspeth
*Assistant Examiner*—Donald L. Storm

[57] ABSTRACT

A user identifier is preassigned to a user, the user identifier being generated by retrieving an implicit checksum and calculating the user identifier (by, for example, using a hidden Markov model) using a checksum operation such as a modulo algorithm so that the user identifier conforms to the implicit checksum, the implicit checksum being based on a checksum parameter, such as the current date or month or a user's phone number. The preassigned user identifier is then received from the user, at and least one recognized identifier is received that is based on the received preassigned user identifier. A checksum is calculated for one recognized identifier using a checksum operation, and the implicit checksum is retrieved. The calculated checksum is compared with the implicit checksum, and the one recognized identifier is selected as the received preassigned user identifier if the calculated checksum equals the retrieved implicit checksum. The selected recognized identifier can be determined as the received user identifier by presenting the selection to the user and receiving confirmation.

21 Claims, 2 Drawing Sheets

SPEECH RECOGNITION SYSTEM WITH IMPLICIT CHECKSUM

FIELD OF THE INVENTION

The present invention is directed to a speech recognition system. More particularly, the present invention is directed to a speech recognition system that uses an implicit checksum.

BACKGROUND OF THE INVENTION

Many institutions, such as banks and airlines, allow customers to access over the telephone a wide variety of services and account information. Before the advent of touch-tone telephones, a customer would obtain these services and information through interacting with a live operator. As touch-tone telephones became more prevalent in homes, these institutions began switching to automated customer-access systems. After dialing a telephone number, a customer using such a system would be asked to enter an identifier or confirmation number. An identifier typically comprises a string of alphanumeric characters.

When using touch-tone phones with an automated customer-access system, a user can enter an identifier by sequentially pressing a series of keys provided on the telephone keypad. Each pressed key corresponds to a different character in the identifier. The pressing of these keys produces a series of tones that are provided over a telephone network to the institution. At the institution, the series of tones are decoded to produce the entered identifier, and if the identifier entered by the user is determined to correspond to a valid identifier, then the user is allowed to enter commands, again through the telephone keypad, that provide access to whatever services are offered by the institution.

Recently, automated customer-access systems have eliminated the use of telephone keypads to obtain the identity of a valid user. Instead of entering an identifier through a telephone keypad, a user is prompted to speak the identifier into the telephone handset. For example, the user may speak into the telephone the identifier "JB123E". The user's voice signal is transmitted over the phone lines to the institution, which employs a speech recognition system to produce a recognized identifier that is intended to correspond exactly to the identifier spoken by the user.

However, such exact correspondence is difficult to attain due to, for example, the deterioration of voice signals that routinely occurs over conventional telephone lines, and the different ways the same words are pronounced by different users. Because of these problems, the speech recognizer may confuse similar sounding letters and numbers. Thus, a speech recognizer may confuse the letter "A" with the number "8", the letter "K", or the letter "J". Similarly, the speech recognizer may confuse the letter "C" with the letter "D" or the number "3". For example, given that a user speaks the identifier "JB123E" into a telephone, the speech recognizer may produce "AE123D" as an output.

One known way to increase the accuracy of known speech recognition systems is to append a checksum onto the identifier. For example, U.S. Pat. No. 5,222,187 discloses the use of a checksum added to an identifier to improve the accuracy of a speech recognition system. The checksum provides a way to independently verify that the other alphanumeric characters of the identifier were correctly recognized. Numerical values assigned to each alphanumeric character are processed by a predetermined checksum operation. The resultant number should equal the checksum identified by the speech recognition system. If it does not, there is an indication that an error has occurred.

However, one drawback with using a checksum is that an additional character (i.e., the checksum) must be added to the identifier. This additional character must be recognized by the speech recognition system. This by itself increases the chances of a recognition error because the accuracy of a speech recognition system decreases as the number of characters in an identifier required to be recognized are increased.

Based on the foregoing, there is a need for a speech recognition system that uses a checksum to recognize an identifier but does not require any additional characters to be added to the identifier.

SUMMARY OF THE INVENTION

One embodiment of the present invention is a speech recognition system that utilizes implicit checksums that are based on checksum parameters to increase its accuracy in recognizing identifiers. The system generates user identifiers and assigns them to users. Each user identifier is generated by retrieving an implicit checksum and calculating the user identifier using a checksum operation so that it conforms to the implicit checksum.

The system receives the assigned user identifier as a speech signal from a user. The system recognizes the received user identifier by providing at least one recognized identifier based on the received identifier. The system then calculates a checksum for one recognized identifier using the same checksum operation that was used to generate the assigned user identifier. An implicit checksum is then retrieved and compared with the calculated checksum. The system selects the one recognized identifier as the received user identifier if the calculated checksum equals the generated implicit checksum.

DETAILED DESCRIPTION

Figure 1:
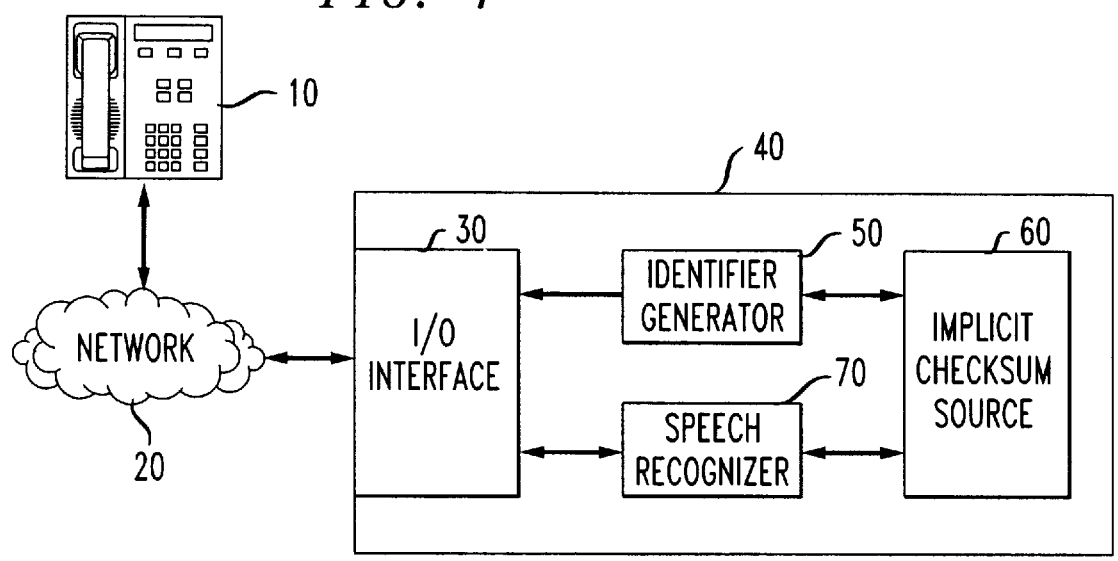
FIG. 1 is a block diagram illustrating one embodiment of a speech recognition system that implements the present invention.

FIG. 1 is a block diagram illustrating one embodiment of a speech recognition system that implements the present invention. The system 40 of FIG. 1 includes an identifier generator 50 and a speech recognizer 70. Identifier generator 50 generates identifiers that are assigned to users. Speech recognizer 70 provides at least one recognized identifier in response to receiving an identifier. The received identifier is a speech signal generated by a user who is attempting to access system 40. Speech recognizer 70 executes one of many known speech recognition routines to provide the recognized identifier. In one embodiment, speech recognizer 70 utilizes a Hidden Markov Model to generate a list of "N-best" choices of recognized identifiers. An example of this method of speech recognition is disclosed in U.S. Pat. No. 5,241,619, herein incorporated by reference.

System 40 further includes an I/O interface 30. I/O interface 30 interfaces system 40 to a user. In the embodiment shown in FIG. 1, I/O interface 30 is coupled through a network 20 to a telephone 10. Telephone 10 enables a user of system 40 to access system 40. The user can transmit a speech signal to system 40 through telephone 10 as well as receive signals from system 40. Network 20 can be any network that enables the customer at telephone 10 to dial into system 40. For example, network 20 can be the Public Switched Telephone Network ("PSTN"), a local area network, the Internet, or an intranet.

In another embodiment, system 40 is used locally by a user. In this embodiment, the user communicates directly with I/O interface 30 and I/O interface 30 includes a microphone and speaker.

Both identifier generator 50 and speech recognizer 70 are coupled to an implicit checksum source 60. Implicit checksum source 60 provides at least one implicit checksum that is used by speech recognizer 70 when recognizing an identifier and by identifier generator 50 when generating an identifier. Implicit checksums are checksums used by system 40 to increase the accuracy of recognizing an identifier without requiring an additional checksum character to be appended to each identifier.

The implicit checksums provided by checksum source 60 are based on a checksum parameter. The checksum parameter is any parameter that can be input to checksum source 60. For a particular checksum parameter, checksum source 60 will always provide the same implicit checksum. For example, in one embodiment the checksum parameter is the current month of the year. In this embodiment, the implicit checksum provided by checksum source 60 is "1" during January, "2" during February, etc. Further, in another embodiment the checksum parameter is a user's phone number, specifically the first digit of the area code. In this embodiment, for example, if the user's area code is "201", the implicit checksum is "2"; if the area code is "512" the implicit checksum is "5", etc.

The checksum parameter can be obtained internally or externally from system 40. For example, in the embodiment where the checksum parameter is the current month, system 40 has an internal calendar that provides the current month to implicit checksum source 60. In the embodiment where the checksum parameter is the user's phone number, the user can provide their phone number to system 40 during each access attempt, or system 40 can obtain the phone number based on automatic number identification ("ANI"). However, if the phone number is obtained through ANI, system 40 must include some method for insuring that the user is calling from their own phone number.

Figure 2:
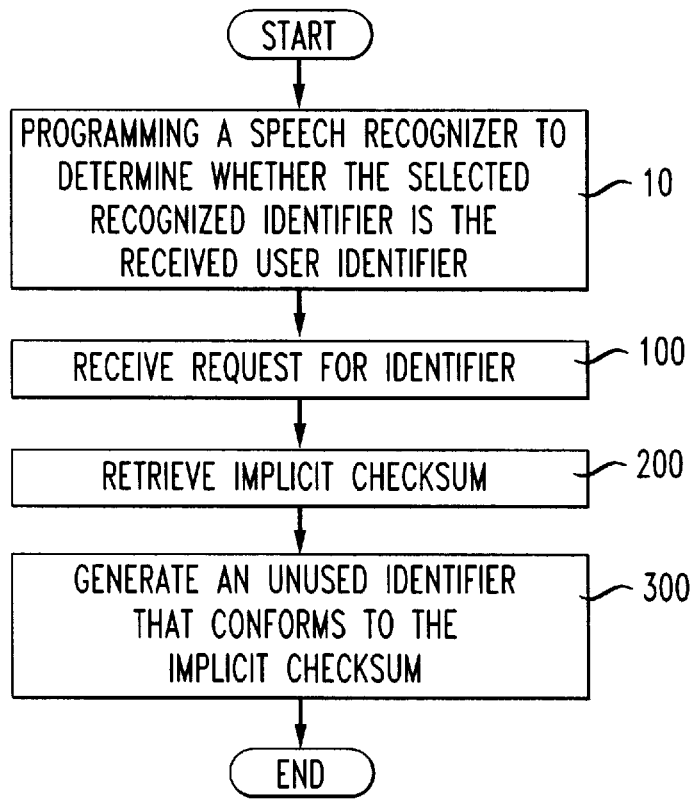
FIG. 2 is a flowchart illustrating steps performed by the identifier generator in accordance with one embodiment of the present invention.

FIG. 2 is a flowchart illustrating the steps performed by identifier generator 50 when a new user identifier for a user is generated. At step 100, a request for an identifier is received. In one embodiment, the request is generated by a transaction executed by system 40. For example, if system 40 provides airline reservations, a user identifier can be a confirmation number given to a user. When a reservation is made, a request for a user identifier will be automatically sent to identifier generator 50.

At step 200, identifier generator 50 retrieves an implicit checksum from implicit checksum source 60. The implicit checksum, as previously described, is based on a checksum parameter.

At step 300, identifier generator 50 generates a user identifier that is not currently active or assigned to a user. The user identifier must conform to the received implicit checksum. An identifier conforms to the implicit checksum if a checksum calculated for the identifier using a predetermined checksum operation equals the implicit checksum. Any checksum algorithm can be used for the predetermined checksum operation. For example, in one embodiment all user identifiers are entirely numeric and six digits long, and the predetermined checksum operation used by system 40 is the identifiers' sum modulo-10. If the received implicit checksum is 1, the user identifier generated by identifier generator 50 is any generally unused six digit number whose sum modulo-10 equals 1. Possible user identifiers in this example would include "926455", "000001", "999996", "222221", etc.

Figure 3:
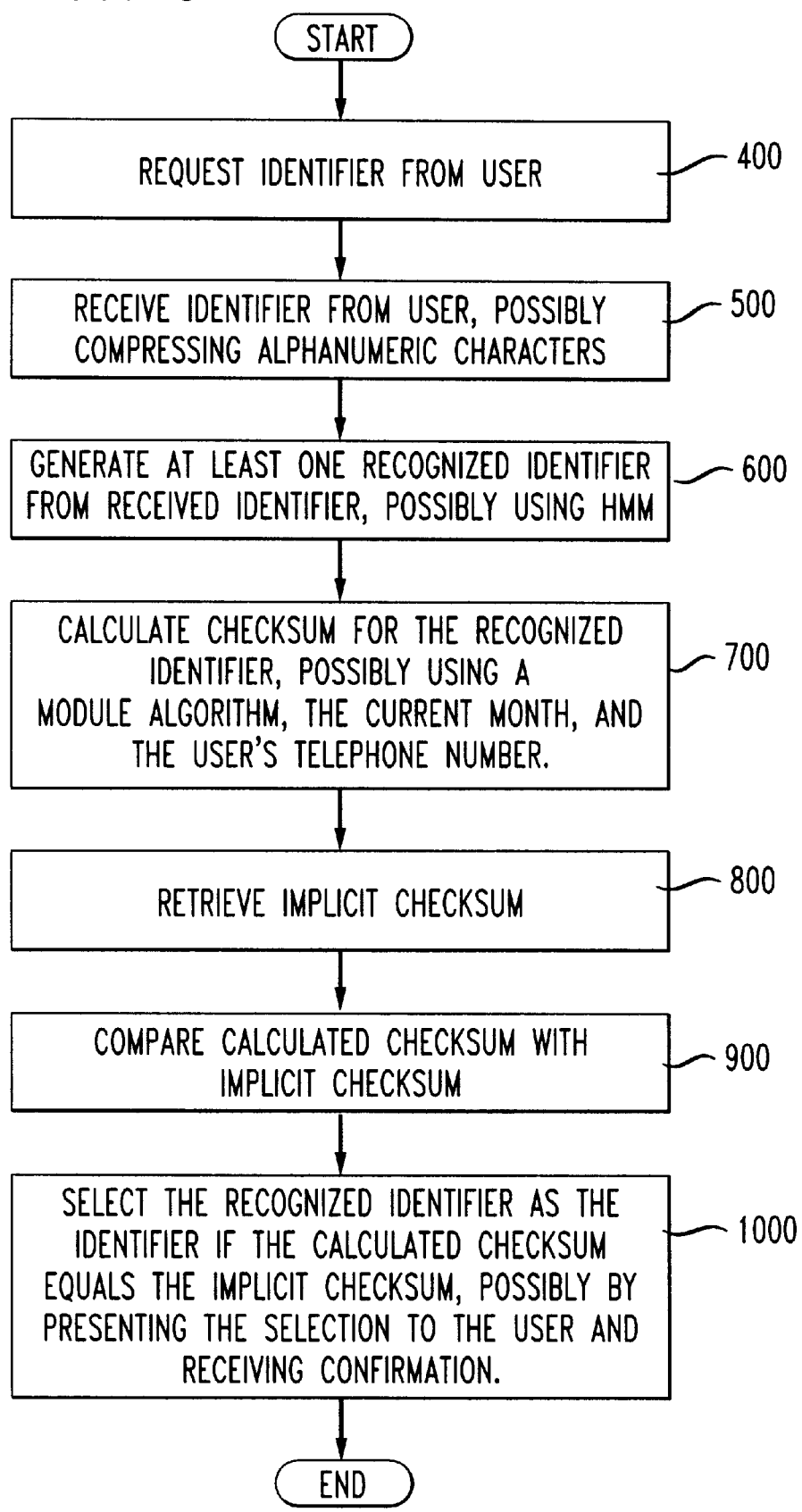
FIG. 3 is a flowchart illustrating the steps performed by the speech recognizer in accordance with one embodiment of the present invention.

FIG. 3 is a flowchart illustrating the steps performed by speech recognizer 70 when a user attempts to access system 40. The user can initiate an access attempt by dialing a telephone number associated with system 40 or interacting with system 40 locally.

At step 400 a user identifier is requested from the user. The request can be in the form of a computer generated voice instructing the user to speak their preassigned identifier.

At step 500, speech recognizer 70 receives a speech signal generated by the user's utterance in response to the identifier request. For example, the customer identifier "123456" will be spoken by the user if this is the identifier preassigned to the user. The speech signal is the received user identifier.

At step 600, speech recognizer 70 generates at least one recognized identifier from the received user identifier. If multiple recognized identifiers are generated, speech recognizer 70 may assign a probability to each recognized identifier using known methods. The probability is a measure of the likelihood that the recognized user identifier equals the identifier.

At step 700, a checksum is calculated for each recognized identifier using the same predetermined checksum operation that was used by identifier generator 50 to generate the user's preassigned identifier. For example, if the predetermined checksum operation used by identifier generator 50 is a modulo-10 sum, then the checksum is calculated for each recognized identifier using modulo-10 addition. In this example, if a recognized identifier is 123456, the calculated checksum for this recognized identifier is 1+2+3+4+5+6 modulo-10, or 1.

At step 800, at least one implicit checksum is retrieved from implicit checksum source 60. As previously described, the implicit checksum is based on a checksum parameter.

At step 900, the calculated checksum for each recognized identifier is compared to the retrieved implicit checksum.

At step 1000, if one recognized identifier was generated at step 600, that recognized identifier is selected as the received user identifier if the calculated checksum for the recognized identifier is equal to the implicit checksum. If more than one recognized identifier is generated at step 600, any recognized identifiers whose calculated checksums equal the implicit checksum are selected as the received user identifier.

When at least one recognized identifier is selected as the received user identifier, system 40 determines whether the selected recognized identifier or one of the selected recognized identifiers are the received user identifier. The determination can be made by, for example, presenting the selected recognized identifiers to the user and giving the user an opportunity to respond as to whether each selected identifier is equal to the received user identifier, and consequently the user's preassigned identifier.

The present invention is most suitable for a system in which only a portion of all possible identifiers is active at one time. For example, in one embodiment the present invention is used in an airline reservation system. In this example, the user identifiers are six digit reservation confirmation numbers. The confirmation numbers are only active for the month they are generated. Further, in this example the checksum parameter is the month of the year. During January, for example, all confirmation numbers generated for users will conform to the implicit checksum for January (e.g., 1). Because each confirmation number expires during the month, a user will only attempt to access system 40 during January. Therefore, all confirmation numbers received by speech recognizer 70 during January will have a checksum of 1, and during the recognition routine of FIG. 3 the implicit checksum retrieved from implicit checksum source 60 will also be a 1. The confirmation numbers will then be subject to a checksum verification without having to include an extra character in the form of a checksum.

In another embodiment, multiple implicit checksums can be retrieved at step 800 in FIG. 3. For example, in the airline reservation system, the confirmation numbers may be active for one month after they are generated. A confirmation number (the user identifier) received by speech recognizer 70 in February may have been generated in January or February. In this embodiment, therefore, at step 800 the implicit checksum for January (e.g., "1") and the implicit checksum for February (e.g., "2") will be retrieved. All recognized identifiers whose calculated checksum matches either implicit checksum will be selected as identifiers.

Several embodiments of the present intention are specifically illustrated and/or described herein. However, it will be appreciated that modifications and variations of the present invention are covered by the above teachings and within the purview of the appended claims without departing from the spirit and intended scope of the invention.

What is claimed is:

1. A method of recognizing a received user identifier assigned to a user, said method comprising the steps of:
   (a) preassigning to the user a user identifier, the user identifier being generated by retrieving an implicit checksum and calculating the user identifier using a checksum operation so that the user identifier conforms to the implicit checksum, the implicit checksum being based on a checksum parameter;
   (b) receiving from the user the preassigned user identifier;
   (c) receiving at least one recognized identifier based on the received preassigned user identifier;
   (d) calculating a checksum for one recognized identifier using a checksum operation;
   (e) retrieving the implicit checksum;
   (f) comparing the calculated checksum with the implicit checksum; and
   (g) selecting the one recognized identifier as the received preassigned user identifier if the calculated checksum equals the retrieved implicit checksum.

2. The method of claim 1, further comprising the step of:
   (h) determining whether the selected recognized identifier is the received user identifier.

3. The method of claim 2, wherein step (h) comprises the steps of:
   (h-1) presenting the selected recognized identifier to the user; and
   (h-2) receiving from the user a determination of whether the selected recognized identifier is the received user identifier.

4. The method of claim 1, wherein the checksum operation is a modulo algorithm.

5. The method of claim 1, wherein the checksum parameter is a current month.

6. The method of claim 1, wherein the checksum parameter is a phone number of the user.

7. The method of claim 1, wherein step (a) comprises the step of using a Hidden Markov Model to generate N-best choices.

8. The method of claim 1, wherein the received user identifier comprises a plurality of alphanumeric characters.

9. The method of claim 1, wherein the received user identifier is received as a speech signal.

10. A method of operating a speech recognition system comprising the steps of:
    (a) preassigning to the user a user identifier, the user identifier being generated by retrieving an implicit checksum and calculating the user identifier using a checksum operation so that it conforms to the implicit checksum, the implicit checksum being based on a checksum parameter;
    (b) receiving from the user the preassigned user identifier as a speech signal; and
    (c) recognizing the received preassigned user identifier;
    step (a) further including the substeps of:
    (a-1) retrieving the implicit checksum; and
    (a-2) calculating the user identifier so that it conforms to the implicit checksum using a checksum operation; and
    step (c) further including the substeps of:
    (c-1) providing at least one recognized identifier based on the received user identifier;
    (c-2) calculating a checksum for one recognized identifier using the checksum operation;
    (c-3) retrieving the implicit checksum;
    (c-4) comparing the calculated checksum with the implicit checksum; and
    (c-5) selecting the one recognized identifier as the received user identifier if the calculated checksum equals the implicit checksum.

11. The method of claim 10, wherein step (c) further comprises the step of:
    (c-6) determining whether the selected recognized identifier is the received user identifier.

12. The method of claim 10, wherein the checksum operation is a modulo algorithm.

13. The method of claim 10, wherein the checksum parameter is a current month.

14. The method of claim 10, wherein the checksum parameter is a phone number of the user.

15. The method of claim 10, wherein step (c-1) comprises the step of using a Hidden Markov Model to generate N-best choices.

16. The method of claim 10, wherein the user identifier comprises a plurality of alphanumeric characters.

17. The method of claim 10, further comprising the step of requesting the user identifier from the user.

18. A speech recognition system comprising:
    an implicit checksum source that generates an implicit checksum based on a checksum parameter;
    an identifier generator coupled to the implicit checksum source that generates a user identifier, the user identifier being generated by retrieving an implicit checksum and calculating the user identifier using a checksum operation so that the user identifier conforms to the implicit checksum, the implicit checksum being based on a checksum parameter; and a speech recognizer coupled to the implicit checksum source; wherein said speech recognizer recognizes the user identifier when the user identifier is received as a speech signal.

19. The speech recognition system of claim 18, wherein said identifier generator is programmed to:

retrieve an implicit checksum from said implicit checksum source; and calculate the user identifier so that conforms to the implicit checksum using a checksum operation.

20. The speech recognition system of claim 19, wherein said speech recognizer is programmed to:

provide at least one recognized identifier based on the received user identifier;

calculate a checksum for one recognized identifier using the checksum operation;

retrieve the implicit checksum;

compare the calculated checksum with the implicit checksum; and select the one recognized identifier as the received user identifier if the calculated checksum equals the generated implicit checksum.

21. The speech recognition system of claim 20, wherein said speech recognizer is further programmed to determine whether the selected recognized identifier is the received user identifier.

* * * * *